United States Patent
Fallon et al.

(10) Patent No.: US 7,787,393 B2
(45) Date of Patent: Aug. 31, 2010

(54) PERIODICAL REFRESHING FOR RADIO CHANNELS QUALITY INDICATOR

(75) Inventors: Henri Fallon, Paris (FR); Stéphane De Marchi, Paris (FR); Guillaume Defoug, Paris (FR)

(73) Assignee: Dibcom, Palaiseua (FR)

( * ) Notice: Subject to any disclaimer, the term of this patent is extended or adjusted under 35 U.S.C. 154(b) by 90 days.

(21) Appl. No.: 12/213,789

(22) Filed: Jun. 24, 2008

(65) Prior Publication Data

US 2009/0010282 A1    Jan. 8, 2009

(30) Foreign Application Priority Data

Jun. 26, 2007    (EP) .................................. 07301152

(51) Int. Cl.
*H04J 1/16*    (2006.01)
(52) U.S. Cl. ........................................ 370/252; 370/480
(58) Field of Classification Search ................. None
See application file for complete search history.

(56) References Cited

U.S. PATENT DOCUMENTS

| | | | | |
|---|---|---|---|---|
| 4,977,612 A | * | 12/1990 | Wilson | ..................... 455/166.1 |
| 5,457,711 A | * | 10/1995 | Kellermann | ................. 375/347 |
| 6,122,293 A | | 9/2000 | Frodigh et al. | |
| 7,391,750 B2 | * | 6/2008 | Kim et al. | .................... 370/329 |
| 2006/0094371 A1 | | 5/2006 | Nguyen | |
| 2006/0292988 A1 | | 12/2006 | Yuen et al. | |
| 2008/0075147 A1 | * | 3/2008 | Grossman et al. | ........... 375/136 |
| 2008/0132173 A1 | * | 6/2008 | Sung et al. | ............... 455/67.13 |
| 2008/0268786 A1 | * | 10/2008 | Baker et al. | .............. 455/67.11 |

FOREIGN PATENT DOCUMENTS

WO        WO 99/41872        8/1999

* cited by examiner

*Primary Examiner*—Min Jung
(74) *Attorney, Agent, or Firm*—McKenna Long & Aldridge LLP

(57) ABSTRACT

This method for receiving a data stream transmitted over several radiofrequency channels each with a different frequency, comprises scanning the bandwidth to identify available radiofrequency channels, determining a quality indicator for each available radiofrequency channel and selecting a channel for receiving the data stream depending upon said quality indicators. The method further comprises determining a refreshing period for the quality indicator of each available channel and weighting every determined refreshing period depending on the value of the quality indicator of the currently received channel.

12 Claims, 1 Drawing Sheet

PERIODICAL REFRESHING FOR RADIO CHANNELS QUALITY INDICATOR

This application claims priority from European Patent Application No. 07 301 152.0, filed Jun. 26, 2007, which is hereby incorporated by reference for all purposes as if fully set forth herein.

BACKGROUND OF THE INVENTION

The present invention relates to the reception of bit streams broadcasted on several radiofrequency channels, as for example in Digital Video Broadcast (DVB) environments.

In DVB systems, programs are repeatedly transmitted over several transport streams (TS). Each transport stream is labelled by use of three different tags or identifiers. A network ID identifies the network emitting the stream, an original network ID identifies the network where from the stream is originated and a transport stream ID identifies the transport stream.

Each stream is sent over one or several radiofrequency channels, each channel having a different frequency.

When using an IP protocol, a so-called SI/PSI table, or service table, maps the IP address of the data with frequencies to allow retrieving the data.

Upon reception, the tuner is set to the proper radiofrequency and sorts the packets to retrieve a selected program.

However, the radiofrequency channels are subject to variations due, for example, to environmental changes and to signal fading.

Such changes are bound to increase in a mobile environment where the receiver and/or the environment situation evolve quickly. Furthermore, the tables mapping radiofrequencies and IP addresses are valid only within determined geographical areas. When moving from an area to another, the same radiofrequency will be used to carry different programs.

Usually, the receiver starts by scanning the bandwidth to detect every available radiofrequency channel. Then, a quality indicator is determined for each radiofrequency channel. The receiver locks-on a channel which quality indicator is above a determined threshold and processes the signals carried by that channel.

In existing devices, receivers hold onto a selected channel until a loss of signal occurs, i.e. until the quality is too low for processing. In these situations receivers can either wait until the signal quality increases again, or start over again by scanning the bandwidth. This leads to long delays in the processing when the quality decreases.

SUMMARY OF THE INVENTION

One object of the present invention is a receiving method more appropriate for mobile environments as claimed in claim 1 and a corresponding receiver as claimed in claim 12.

BRIEF DESCRIPTION OF THE DRAWINGS

Other features and advantages of the invention will become apparent upon reading the following description given only by way of non limiting example, and offered with reference to the annexed figures in which.

DESCRIPTION OF PREFERRED EMBODIMENTS

Figure 1:
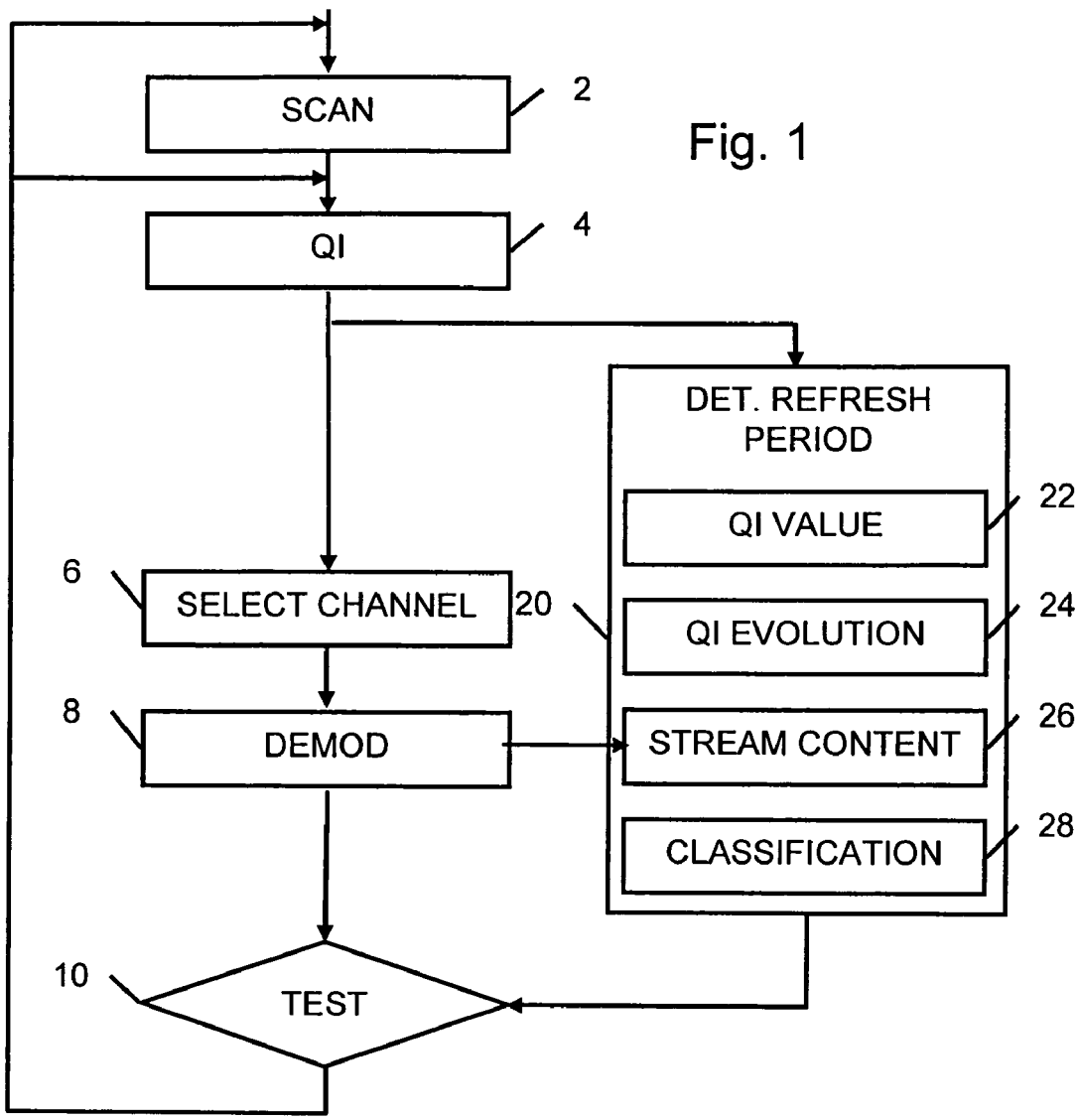
FIG. 1 represents a general flow chart of the process of the invention.

In this example illustrated with reference to FIG. 1, a mobile appliance is used to receive a digital program transmitted over several radiofrequencies channels and more precisely, a DVBH program transmitted using an IP protocol.

The mobile appliance starts the receiving method by a step 2 of scanning the bandwidth to identify every available channel. This step is also known as a "full band scan".

The method then comprises a step 4 of determining a quality indicator, referenced as QI, for each available channel. Many different computing methods and quality indicators can be used. One very common QI is the signal to noise ratio even if this indicator depends upon the modulation parameters. Advantageously, the QI is independent from the modulation parameters allowing fast and reliable comparison of radiofrequency channels regardless of their modulation parameters.

Generally speaking, the QI indicates if the tuner is able to receive a stream on this radiofrequency channel and to process the signal to retrieve the IP packets with their content.

Depending upon the utilisation of the appliance, one radiofrequency channel is then selected in a step 6. For example, this selection results from a request from a user for a specific program driving the appliance to seek for a stream carrying packets with a corresponding specific IP address. The appliance uses service tables mapping the programs with IP addresses and channel frequencies to set the tuner. In the embodiment described, the services tables are known as INT tables (IP/Mac Notification Tables) and can be combined with other SI/PSI tables.

During a step 8, the data stream is received and processed in a conventional manner.

In a test 10, the method evaluates the needs for refreshing the quality indicator of the current received radio channel. A refreshing period is set in the appliance for the quality indicator and when this period is expired, the process turns back to step 4 and evaluates again the quality indicator of the selected channel. Alternatively, if the signal is lost, then the method goes back to step 2 and starts over by scanning the entire bandwidth.

In addition to these steps, the method of the invention further comprises a step 20 of determining the refreshing period for at least the current radio channel, based on the corresponding quality indicator.

In a first embodiment, the method comprises a step 22 of analyzing the quality indicator value. Different quality indicators threshold are set and a corresponding refreshing period is determined for each range. For example, if the quality indicator value is high, meaning above a first threshold, the refreshing period might be set long. On the contrary, if the quality indicator is below a second threshold, the refreshing period might be very short.

Of course, any kind of transfer function can be used to directly obtain the refreshing period from the quality indicator.

Advantageously, the method also comprises a step 24 of analyzing the evolution of the quality indicator over several samples. In this case, if the quality indicator tends to increase, then the refreshing period will be longer. On the contrary, if the quality indicator tends to decrease, the refreshing period will be shorter.

Advantageously, the method also comprises a step 26 of analyzing the content of the data stream currently received to determine a priority level. For example, radio channels carrying sound programs or video programs may have different refreshing periods as these programs can be processed with different levels of quality.

Also, in the described embodiment, the quality indicator computed for each channel identified during the first scan at step 2 is memorized and a specific refreshing period is set for each channel.

In this embodiment, the method further comprises a classification 28 of the radiofrequency channels and a different refreshing period is set for each class.

For example, five classes are set with an increasing refreshing period.

The first class is for the radiofrequency carrying the stream of the program currently being received.

A second class is set for the other radiofrequencies that are identified as also carrying the current program and that lock-on at the tuner level i.e. that the tuner can receive and process.

A third class is set for the radiofrequencies that could possibly carry the current service as identified by the service tables but don't lock-on. Advantageously, this class is also used for radiofrequencies that lock-on at the tuner level but don't carry the required program.

A fourth class regroups the radiofrequencies that don't lock-on and don't carry the required program.

A five class is set for all other radiofrequencies.

For example, the first class of radiofrequencies has a QI refreshed at each burst, the second class has a refreshing period of about 10 to 15 seconds while the fifth class has a refreshing period set about 5 minutes.

In another embodiment, the refreshing periods of all channels are weighed by a transfer depending upon the quality indicator of the currently processed channel.

Figure 2:
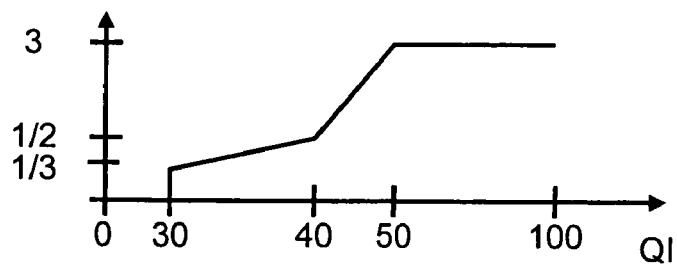
FIG. 2 represents a weighting curve for refreshing periods.

A specific curve is represented in FIG. 2. On this figure, a quality indicator is set between 0 and 100 serves as a x-axis and a weight coefficient serves as a y-axis. This curve represents a transfer function expressing the weight to be applied as a function of the QI value.

Once the QI of the currently processed radiofrequency is determined all other refreshing periods are weighed by a corresponding coefficient. In the case represented, if the QI is between 0 and 30, the refreshing periods are multiplied by zero leading to a constant monitoring of all channels. For QI values between 30 and 40, the refreshing period are multiplied by a value between ⅓ and ½ leading to reduced refreshing periods as a result of the poor quality of the currently processed channel. For values between 40 and 50, the refreshing periods are multiplied by a value between ½ and 3. For a quality indicator higher than 50, the refreshing periods are multiplied by 3 thereby increasing the refreshing periods for every channel when the current channel has a high quality indicator.

As a result, the refreshing period of each radiofrequency channel is adapted depending on the quality of the reception of the currently processed channel.

In such an embodiment, it possible to apply the weighing functions to the refreshing period of the currently processed channel or to handle this specific refreshing period separately.

Such a receiving method also allows different kinds of processing of the received signal. For example, handover decisions are triggered by the value of the quality indicator of the currently received channel, the adaptation of the refreshing period ensuring that the quality indicator is accurate.

If two radio channels carry the same data, a handover can be triggered if the quality indicator of the current radiofrequency channel is higher than the quality indicator of the second channel. This allows handover without loss has the handover is triggered while the current channel still has a quality allowing processing.

In yet another embodiment, the method comprises a step of displaying, to a user of the appliance, a quality indicator of the reception based on the refreshing period.

Of course, many other embodiments and combination of the described embodiments can be achieved.

In one another embodiment, information regarding the geographic repartition of emitters is known and memorised by the mobile appliance. In this case, the method also comprises determining the refreshing period as a function of the geographical position. For example, the radiofrequencies carrying signals emitted by the emitters close to the emitter of the radiofrequency currently received are closely monitored with a small refreshing period.

Furthermore, filters can be set depending on the tags carried by the frequency channels to determine if one frequency channel should be analysed or not. Filters can be set at the level of the data stream to restrict the reception to selected programs, or at the level of the transport with filters on the network ID, the original network ID or the transport stream ID. Other filters can also be set on other identifiers such as the platform identifier as well as on the type of signal based on the used protocol.

For example, one appliance can be set to receive only the programs of one specific network. Accordingly, a filter is set in order not to process any frequency channel carrying another network ID than the one specified in the filter.

Advantageously, the invention is used to save power. More precisely, the invention can be integrated in a method to reduce power consumption. As the refreshing period is adjusted to the channel quality, it can be lowered when the quality is good resulting in power saving.

Similarly, the refreshing period can also be set depending upon the power consumption of the receiving device. For example, the method comprises an analysis of the battery level and when the battery decreases the refreshing period for the quality indicator of each or some channels increases in order to save power.

This can also be applied as a function of the power consumption. The power consumption is analysed and when it exceeds a certain threshold, the refreshing period of the quality indicator of each or some channels increases.

Of course, many other embodiments and combinations of the embodiments described above can be designed.

In particular, the method of the invention can be carried out by a program for a microprocessor.

The method of the invention can also be carried out by any decoder comprising such program or specifically designed to achieve this method.

The invention claimed is:

1. A method for receiving a data stream transmitted over each of a plurality of radiofrequency channels, wherein each has a different frequency, the method comprising:
   scanning the bandwidth to identify at least two of the plurality of radiofrequency channels;
   determining a quality indicator for each of the at least two radiofrequency channels;
   selecting one of the at least two radiofrequency channels to receive the data stream depending upon said quality indicators associated with the at least two radiofrequency channels;
   determining a refreshing period for the quality indicator of each of the at least two radiofrequency channels; and weighting every determined refreshing period depending on the value of the quality indicator of the selected channel.

2. Method according to claim 1, further comprising classifying each of the at least two radiofrequency channels and wherein each of the refreshing periods is set as a function of the class of the corresponding channel.

3. Method according to claim 1, wherein the refreshing period for the quality indicator associated with the at least two radiofrequency channels is determined by applying a transfer to the quality indicator value.

4. Method according to claim 1, further comprising analyzing the variations of the quality indicator associated with the at least two radiofrequency channels, and
wherein the refreshing period for the quality indicator is determined based on the variations.

5. Method according to claim 1, further comprising analyzing the content of the data stream and wherein the refreshing period for the quality indicator associated with the at least two radiofrequency channels is determined based on the content of the data stream.

6. Method according to claim 1, further comprising analyzing the battery level of a receiving device and wherein the refreshing period for the quality indicator associated with the at least two radiofrequency channels is determined based on the battery level.

7. Method according to claim 1, further comprising analyzing the power consumption of a receiving device and wherein the refreshing period for the quality indicator associated with the at least two radiofrequency channels is determined based on the power consumption.

8. Method according to claim 1, further comprising determining the geographical location of an emitter for each of the at least two radiofrequency channels and wherein the refreshing period for the quality indicator of the at least two radiofrequency channels is determined based on the geographical location of the corresponding emitter.

9. Method according to claim 1, further comprising displaying a reception indicator based upon the refreshing period for the quality indicator of the selected radiofrequency channel.

10. Method according to claim 1, further comprising triggering a handover between two radiofrequency channels based upon their quality indicators.

11. A microprocessor comprising a program stored therein that includes instructions to perform a method for receiving a data stream transmitted over each of a plurality of radiofrequency channels, wherein each has a different frequency, the microprocessor-based method comprising:
scanning the bandwidth to identify at least two of the plurality of radiofrequency channels;
determining a quality indicator for each of the at least two radiofrequency channels;
selecting one of the at least two radiofrequency channels to receive the data stream depending upon said quality indicators associated with the at least two radiofrequency channels;
determining a refreshing period for the quality indicator of each of the at least two radiofrequency channels; and
weighting every determined refreshing period depending on the value of the quality indicator of the selected channel.

12. A method for receiving a data stream transmitted over each of a plurality of radiofrequency channels, wherein each has a different frequency, the method comprising:
scanning the bandwidth to identify every one of the plurality of radiofrequency channels that can be received;
determining a quality indicator for each of the radiofrequency channels that can be received;
selecting one of the radiofrequency channels that can be received, so as to receive the data stream, depending upon said quality indicators associated with the radiofrequency channels that can be received;
determining a refreshing period for the quality indicator of each of the radiofrequency channels that can be received; and
weighting every determined refreshing period depending on the value of the quality indicator of the selected channel.

* * * * *